(12) United States Patent
Perry

(10) Patent No.: US 11,129,495 B2
(45) Date of Patent: Sep. 28, 2021

(54) CHAR-PIT UNIVERSAL CHARCOAL GRILL TRAY

(71) Applicant: Jason Perry, Edmond, OK (US)

(72) Inventor: Jason Perry, Edmond, OK (US)

(73) Assignee: Jason Michael Perry, Edmond, OK (US)

( * ) Notice: Subject to any disclaimer, the term of this patent is extended or adjusted under 35 U.S.C. 154(b) by 164 days.

(21) Appl. No.: 16/564,716

(22) Filed: Sep. 9, 2019

(65) Prior Publication Data

US 2021/0068589 A1 Mar. 11, 2021

(51) Int. Cl.
*A47J 37/07* (2006.01)

(52) U.S. Cl.
CPC ....... *A47J 37/0763* (2013.01); *A47J 37/0704* (2013.01)

(58) Field of Classification Search
CPC ............... A47J 37/0704; A47J 37/0763; A47J 37/0786; A47J 2037/0777
See application file for complete search history.

(56) References Cited

U.S. PATENT DOCUMENTS

| | | | | |
|---|---|---|---|---|
| 1,187,009 A * | 6/1916 | Pickup | ................ | A47J 37/0763 126/9 R |
| 2,161,669 A * | 6/1939 | Freeman | ............. | A47J 37/0704 126/25 R |
| 2,928,385 A * | 3/1960 | Peplin | ................ | A47J 37/0763 126/25 R |
| 3,191,592 A * | 6/1965 | Lorbacher | ........... | A47J 37/0704 126/25 A |
| 3,699,876 A * | 10/1972 | Ellis | ..................... | A47J 37/0704 99/396 |
| 4,413,609 A * | 11/1983 | Tisdale | ............... | A47J 37/0763 126/25 R |
| 4,862,792 A * | 9/1989 | Lerma, Jr. | ........... | A47J 37/0704 99/401 |
| 6,681,759 B2 * | 1/2004 | Bentulan | ............. | A47J 37/0704 126/25 R |
| 2001/0035176 A1 * | 11/2001 | Bush, III | ............ | A47J 37/0704 126/25 R |
| 2013/0167824 A1 * | 7/2013 | Calinawan | .......... | A47J 37/0704 126/25 R |
| 2014/0020671 A1 * | 1/2014 | Handyside | .......... | A47J 37/0704 126/25 R |
| 2020/0229642 A1 * | 7/2020 | George | ............... | A47J 37/0704 |

* cited by examiner

*Primary Examiner* — Alfred Basichas

(57) ABSTRACT

A grilling assembly for charcoal grilling is adapted for use with a non-charcoal grill and includes first and second trays. The second tray is configured to slide inside of the first tray to provide adjustability of an outer perimeter of the connected trays. A plurality of connectors and a plurality of supports hold the first tray and the second tray in a fixed position. Flat first and second charcoal grates are positioned within the trays and are held on top of at least a portion of the plurality of supports. The first and second charcoal grates include a plurality of openings and are configured to fit into the first tray and the second tray, respectively. At least one of the first and second charcoal grates is designed to overlap the other so that the first and second charcoal grates conform to the outer perimeter of the trays when overlapped.

14 Claims, 2 Drawing Sheets

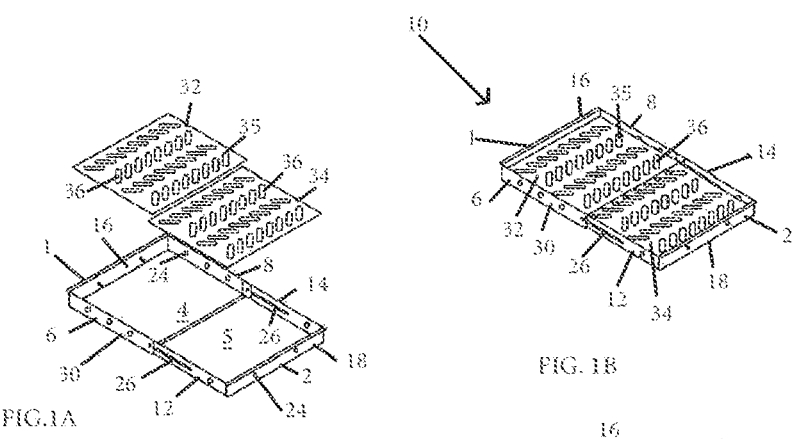
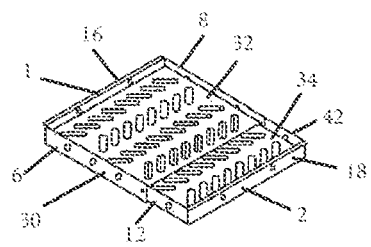
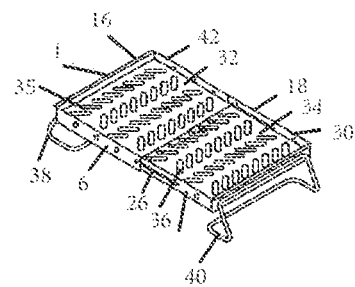

CHAR-PIT UNIVERSAL CHARCOAL GRILL TRAY

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

Field of the Invention

The present invention relates to an outdoor cooking assembly. The embodiments of the current invention more particularly relate to pellet smoker who can produce charcoal flavored foods in addition to wood flavored foods.

Description of the Related Art

Charcoal is a lightweight black carbon residue produced by removing water and other volatile constituents from animal and plant materials. Charcoal is usually produced by slow pyrolysis—the heating of wood or other organic materials in the absence of oxygen. This process is called charcoal burning. The finished charcoal consists largely of carbon.

The advantage of burning charcoal compared to burning wood is the absence of water and other components. This allows charcoal to burn at higher temperatures and give off very little smoke (regular wood gives off a good amount of steam, organic volatiles, and unburnt carbon particles soot in its smoke).

One of the most favorite American pastimes is the outdoor cookout wherein a charcoal grill is used to barbeque chicken, steaks, hamburgers and other foods, particularly for picnics and the like. Normally for such use a standard permanent metal charcoal grill available in various sizes and configurations is used.

There are multiple types of charcoal grill that have been presented in prior art. For instance, a Charcoal grill assembly bearing U.S. Pat. No. 3,209,743A is issued to REDD! PRODUCTS Inc. The patent discloses a charcoal grill comprising, a bowl having a substantially flat bottom wall for supporting hot charcoal, a grid mounted above said bowl for supporting food to be cooked, said bowl having at least one hole in said bottom wall, a solid fuel combustion chamber constituted by a receptacle mounted on said bottom wall and having walls surrounding and extending downwardly from said hole to form a chimney, the lower portion of the receptacle constituting a fuel support, said receptacle having an air inlet in the lower end portion thereof, closure means for selectively closing or opening the inlet in the lower end portion of said receptacle, whereby combustion therein may be regulated at will.

Another patent on Collapsible charcoal grill bearing U.S. Pat. No. 3,503,324A is issued to Hans Gmeiner. The patent discloses a collapsible charcoal grill including a housing having an open top which is closable by a cover member and containing a charcoal pan and grill bars disposed above the pan arid adjustable in height with respect to the pan, the pan being disposed in the housing in such a manner as to define at least one air space with the floor and side walls of the housing, the pan and housing being arranged to close the air space around the upper edges of the housing side walls, at least one lateral side wall having an adjustable opening for the passage of air to the air space, the grill further including lever means for adjusting the height of the grill bars over a large range, detachable members for providing a heat deflector, for protecting the grilling area from wind, and for supporting a rotary spit, and collapsible or foldable legs for supporting the grill when it is to be used.

Another patent on Portable disposable charcoal grill bearing U.S. Pat. No. 3,682,154A is issued to George A Mollere. The patent discloses a portable and disposable charcoal grill of cardboard lined with aluminum foil; the complete grill can be collapsed and provided in a relatively small, rectangular package with the elements nested together and can be quickly and easily assembled; the bottom of the unit can be used as a food warmer-oven while the top is used for barbequeing; the basic body of the grill can be collapsed flat because of opposing vertical folds provided within its sides.

A Combination gas and charcoal grill bearing U.S. Pat. No. 5,878,739A is issued to Percy Guidry Inc. The patent discloses a combined gas and charcoal grill having an adjustable height burner. A combined gas and charcoal grill are provided in which the burner element is pivotably mounted within the grill enclosure so as to permit location adjustment of the burner relative to the grid which supports the food to be cooked. The burner element is configured along with a charcoal tray to form a burner/tray assembly which is vertically movable. Flame height from the burner is also adjustable independent of burner location. A deflector shield is provided to prevent grease and food debris from coming into contact with the burner itself. A removable tray also permits the use of water for steaming and wood chips for smoking. A self-cleaning feature is also provided.

Another patent on Portable combined grill and charcoal starter bearing U.S. Pat. No. 2,920,614A is issued to Morton E Phelps. The patent discloses a combined charcoal starter and grill comprising an elongated substantially U-shaped channel member having a pair of opposed open ends, said member including a bight portion having a substantially rectangular side wall integrally connected with each longitudinally extending edge thereof, said side walls being disposed in spaced, substantially parallel and confronting relation relative to each other, an elongated substantially rectangular slide plate extending across the open side of said U-shaped member, the longitudinal dimension of said slide plate being less than the longitudinal dimensions of said side walls, means slidably connecting said slide plate with said side walls, said slidably connecting means comprising a longitudinally extending side flange projecting laterally and outwardly from the outer longitudinal edge' of each of said side walls, and the longitudinally extending sides of said slide plate being reverted to form a pair of longitudinally extending grooves to slidably receive said side flanges therein, each of the outer end edges of said side walls at a pair of adjacent ends thereof being provided with an integrally formed outwardly projecting end flange optionally engageable within said grooves after said slide plate has been detached from said side flanges, one of said side walls being provided with a plurality of vertically and laterally spaced apertures and the other of said side walls also being provided with a plurality of vertically and laterally spaced apertures, the apertures of each side wall being arranged in'parallel rows extending at substantially right angles to the outer longitudinal edge of the side wall, corresponding rows of the respective apertures being disposed in confronting aligned relation relative to each other, and a pair of grills, each of said grills including a plurality of laterally spaced and elongated tines, said tines being releasably secured within the apertures of said confronting aligned rows.

Charcoal grill conversion apparatus bearing U.S. Pat. No. 3,824,984A is issued to H SwansonM Swanson. The patent discloses a device for converting a standard charcoal grill to a gas fired cooking apparatus. The burner comprises a series of rings which have upwardly facing apertures which are disposed concentrically about a central axis of a typical bowl shaped charcoal grill. Rigid members depend from the rings and rest upon the bottom of the grill (to support the burner generally parallel to the open top portion thereof). The rings are connected to a source of gas either through the side or over the side of the grill. In addition, a special grate fabricated from sheet metal for supplying a greater proportion of conductive heat to the food being cooked may be suspended above the grill.

Another patent discussing a Combined charcoal grill and pit barbecue cooker bearing U.S. Pat. No. 3,699,876A is issued to CLARENCE E ELLIS. The patent discloses a common casing encloses an ash pit and grate for a pit-type barbecue cooker and an overhead pan for drippings or for the support of charcoal when the device is utilized as an outdoor charcoal grill. An adjustable grill rack is mounted in the casing above the pan and an adjustable stack with damper in the top of the casing allows smoke from a wood fire to be circulated across food on the grill rack.

A Portable Hibachi-type charcoal grill with kindling structure bearing U.S. Pat. No. 4,413,609A is issued to Reynold D. Tisdale. The patent discloses a portable Hibachi-type charcoal burning food grill has incorporated therewith a structure for kindling the charcoal and consists of two separate parts: the first part is a shallow upstanding Hibachi-type container for the charcoal, open at the top like a conventional Hibachi and also open at the bottom, the bottom opening being covered by a grate on which the charcoal is piled; and the second part is a tapered upstanding kindling enclosure below the Hibachi that may be integral with or separate from the Hibachi. When provided separately, the kindling enclosure is open at the top, tapers outward from the top to the bottom thereof and has a multitude of uniformly spaced air passage holes therein. The top of the separate kindling structure fits the bottom of the Hibachi so that flames from burning kindling material such as paper, in the kindling enclosure, fed by air flow through the spaced air passages therein flows upward through the opening in the bottom of the Hibachi and ignites the coals on the grate. When the coals are ignited, the Hibachi can be removed from the kindling enclosure and set on its legs if desired.

There are multiple solutions that have been presented in prior art. However, these solutions are limited and restricted to their conventional architecture, installation system and have considerable shortcomings which adversely affect the convenience with which they can be used. The prior systems have certain limitations including the design of charcoal trays which make them suitable for certain types of brands only. These charcoal trays are only designed for gas grills in which the gas flames heat up the charcoal. Moreover, the bottom of the charcoal tray has holes for gas flames to heat up the charcoal in turn leaving a messy ashy mess in the grill. None of these preexisting charcoal trays are universal and easy to utilize.

It has to be noted that the current invention proposes an advancement in providing multiple advancements including presenting a universal charcoal grill tray and grates which provide an alternative option for various smokers, gas grills, and electric grill users. The universal charcoal grill tray and grates also can be utilized as an adjustable charcoal grill. The universal charcoal grill tray and grates provides for an alternative option for various smokers, gas grills, and electric grills users. It is designed to cook user's food with charcoal in any type of grill or various smoker without leaving ashy mess.

None of the previous inventions and patents, taken either singly or in combination, is seen to describe the instant invention as claimed. Hence, the inventor of the present invention proposes to resolve and surmount existent technical difficulties to eliminate the aforementioned shortcomings of prior art.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

FIG. 1A depicts an exploded perpendicular view of one preferred embodiment of the grilling assembly, illustrating the connectable and adjustable trays and the charcoal grates used therewith;

FIG. 1B illustrates a perspective view of the connectable, adjustable trays of FIG. 1A and the charcoal grills positioned upon the connectable, adjustable trays;

FIG. 1C depicts a perspective view of the connectable, adjustable trays in an adjusted position with the charcoal grates positioned thereupon in an overlapping position;

FIG. 1D illustrates the invention shown in FIG. 1B but including a pair of legs connected to each tray;

Figure 2A:
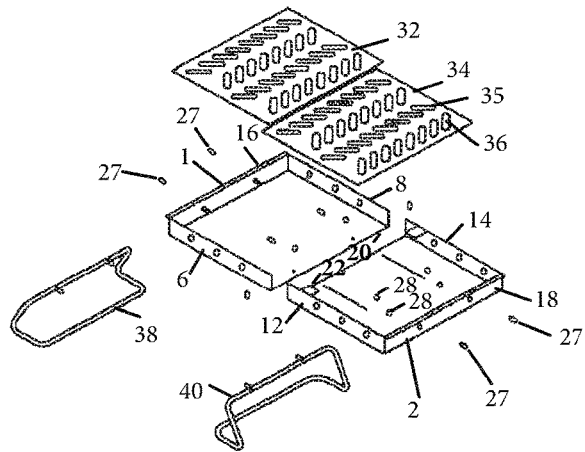
FIG. 2A depicts and exploded perpendicular view of another preferred embodiment of the grilling assembly, illustrating a plurality of connectors and a plurality of supports (only a few of the plurality of connectors and a few of the plurality of supports identified by their respective numerals) used to connect the trays and to support the grills, respectively, and a pair of legs connectable to each tray.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

SUMMARY

In light of the disadvantages of the prior art, the following summary is provided to facilitate an understanding of some of the innovative features unique to the present invention and is not intended to be a full description. A full appreciation of the various aspects of the invention can be gained by taking the entire specification, claims, drawings, and abstract as a whole.

The objective of the invention is to provide a universal charcoal grill tray and grates which provide an alternative option for various smokers, gas grills, and electric grill users It is also the objective of the system to provide a universal charcoal grill tray and grates assembly which can be utilized as an adjustable charcoal grill.

According to another aspect of the invention, it is also the objective of the invention to provide a universal charcoal tray and grates assembly designed to be universal and to slide back and forth to fit all types of grills including but not limited to charcoal grills, electric grills, gas grills, pellet smokers and other various smokers.

According to another aspect of the invention, the architecture is suitable for avoiding ashy mess after utilizing the assembly.

It is further the objective of the invention to provide an invention which is to permit a charcoal grill to be readily folded into suitcase form for easy transportation and storage.

It is also the objective of the invention to provide a single universal unit which is complete and includes all components necessary for one use; that is, the grill body, and a grating for use as a cooking surface.

It is moreover the objective of the invention to provide an easy to use assembly which is straight-forward and takes no particular skill; indeed, the unit may be assembled by one person in less than 1 minute;

According to another aspect of the invention, the assembly is durable and long lasting.

It is also the objective if the invention to provide charcoal grill, and more specifically to a portable grill to be used outdoors for the preparation of meals.

Other aspects, advantages and novel features of the present invention will become apparent from the detailed description of the invention when considered in conjunction with the accompanying drawings.

This Summary is provided merely for purposes of summarizing some example embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

DETAILED DESCRIPTION

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used—in this specification, specify the presence of stated features, steps, operations, elements, and/or components, but do not preclude the presence or addition of one or more other features, steps, operations, elements, components, and/or groups thereof.

The present invention is directed to a universal assembly which is suitable for any type of cooking or bbq assembly. The CHAR-PiT is a universal charcoal grill tray and grates which are required after an investment in a pellet smoker. The pellet smoker only produced wood flavored foods and there was a desire for charcoal flavored foods.

Most of the time when purchasing a grill or smoker, consumers have five choices to choose from various smokers, gas grills, electric grills, charcoal grills and combination grill (gas and charcoal). The universal charcoal grill tray and grates provides rather an inexpensive approach to convert three of the five options into a charcoal grill.

The assembly as per its preferred embodiments consist of trays and grates. These can be further viewed from FIGS. 1A, 1B, 1C, and 1D, as well as FIGS. 2A and 2B. The trays fit inside each other that slide back and forth allowing trays to extend and contract. Both of trays 1 and 2 have breathing holes to allow air to circulate.

The assembly as per its further embodiments also possess Grates: The grates are light and flat with holes and used to hold charcoal or used as a cooking surface.

A general mechanism of using the assembly includes but not limited to includes Tray 1 has a hole for a screw to feed through. Tray 2 has a long slit allowing Tray 1 and Tray 2 to slide together and apart. Wingnuts hold both trays together and acts as a support to hold up the grates.

As per its further embodiment consumers has to complete a simple assembly process to adjust and fit the universal charcoal ash tray and grates (FIGS. 1A and 2A-2B). to their smoker or grill. Tray 2 slides inside Tray 1. Next feed the screws through Tray 1 and tighten with the wingnuts. Remove the cooking or food grates and place the assembly into the smoker or grill, adjust to fit the smoker or grill, and firmly tighten the wingnuts to secure the assembly. Lay the grates onto the screws and wingnuts. Pour charcoal onto the grates and light on fire. Once the charcoals are hot and gray replace the cooking or food grates to grill food. After the charcoals and ashes are cool and the fire is out, remove the cooking or food grates.

Remove the universal charcoal ash tray and grates from the smoker or grill. Lift the grates from the tray (FIGS. 1A-1D and FIG. 2A and). Dump the cooled charcoals and ashes collected in the charcoal tray into the waste basket.

Referring to FIGS. 1A-1D and FIGS. 2A and 2B, the grilling assembly 10 includes a first tray 1 and a second tray 2. Each includes a flat base plate 4, 5, respectively. Each flat base 4, 5 has a pair of spaced-apart sidewalls. One pair of sidewalls 6, 8 are connected to and extend above opposing outer edges of base plate 4. The other pair of sidewalls 12, 14 are connected to and extend above opposing outer edges of base plate 5. Each base plate 4, 5 also includes an outer wall 16, 18, respectively. The outer wall 16 of base plate 4 extends above the base plate 4 and connects to ends of the sidewalls 6, 8. The outer wall 18 of base plate 5 connects to and extends above the base plate 5 and connects to ends of the sidewalls 12, 14. Each tray 4, 5 includes open ends 20, 22, which permit one tray 4, 5 to slide inside of the other tray 4, 5. In the present embodiment, tray 5 is configured to slide within tray 4. Each sidewall 6, 8, 12, 14, and each end wall 24 includes a plurality of openings 24 therein. (only some of the plurality of openings are designated by numeral "24").

The sidewalls 12, 14 of tray 5 each include a slit 26 in each sidewall 12, 14. The plurality of openings 24 and the two slits 26 are positioned to accommodate fasteners or connectors to adjustably connect trays 4 and 5 together to form at least a portion of the grilling assembly 10.

Figure 2B:
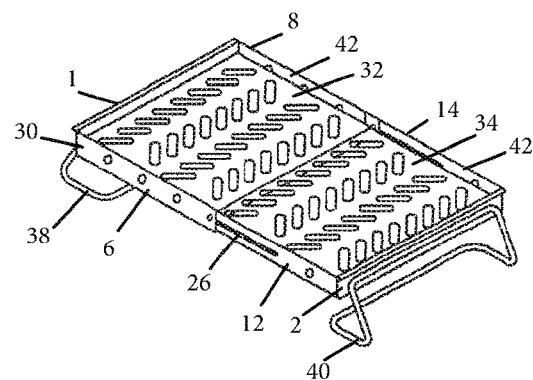
FIG. 2B illustrates the invention as shown in FIG. 2A, but showing the trays connected by the connectors and the grills positioned in the trays, and one of each of the pair of legs connected to one tray.

A plurality of connectors 27 including screws are shown in FIG. 2A. Only a portion of the plurality of connectors are designated by the numeral 27. It will be understood that the connectors 27 will be positioned through the plurality of openings 24 and the pair of slits 26 to connect tray 1 and tray 2 together, and also to connect one or more legs to the trays 1, 2. The plurality of connectors 27 include screws. A plurality of supports 28 are also provided to connect to the connectors 27, as also illustrated in FIGS. 2A and 2B. Only a portion of the plurality of supports are designated by the numeral 28. The plurality supports 28 include wingnuts. The plurality of connectors 27 and the plurality of supports 28 cooperate to adjustably connect tray 1 and tray 2 together, that is, to enlongate or to shorten a length of combined trays 1 and 2. The plurality of connectors 27 and the plurality of supports 28 also cooperate to hold tray 1 and tray 2 in a fixed position relative to each other, thereby forming a fixed outer perimeter 30 of the grilling assembly 10. The plurality of connectors 27 and the plurality of supports 28 also cooperate to support the first charcoal grate 32 and the second charcoal grate 34 in the first and second trays 1, 2, respectively.

Each of the first and second charcoal grates 32, 34 is formed as a flat plate. In each of the first and the second charcoal grates 32, 34, a plurality of ovoid perimeters 35 form a plurality of openings 36 in the first and second grates 32, 34. At least one of the first and second charcoal grates 32, 34, is configured to overlap the other, in order to conform to the outer perimeter 30 formed by connected trays 1 and 2, as shown in FIG. 1C. The first and second charcoal grates 32, 34 are positioned in tray 1 and 2 such that at least a portion of each first and second charcoal grates 32, 34 is supported by at least one of the plurality of connectors 27 and at least one of the plurality of supports 28. A portion of the outer perimeter 30 is positioned above the grates 32, 34.

Optionally, at least one leg, such as legs 38, 40 are provided, may be connected to trays 1 and 2, respectively. Legs 38 and 40 support connected trays 1 and 2, respectively, a distance above a surface, such as an inner surface of a non-charcoal grill (not shown).

In using the grilling assembly 10, the first and second trays 1, 2 are connected via at least a portion of the plurality of connectors 27 via the plurality of openings 24 and the pair of slits 26 Optionally, the legs 38, 40 are connected to the trays 1, 2, respectively. The connected but not yet fixed trays 1, 2 are inserted into an open space of a non-charcoal grill. A length of the connected trays is adjusted to the dimensions of the open space, and at least a portion of the plurality of supports 28 are used to fix the trays 1, 2 in the desired fixed position, therefore fixedly forming the outer perimeter wall 30 of the grilling assembly 10. To prepare for adding charcoal, the first and second charcoal grates 32, 34 are then positioned into the trays 1, 2, respectively, and the first and second charcoal grates 32, 34 are overlapped when the first and second trays, respectively, are overlapped. The first and second charcoal grates 32, 34 are supported by at least a portion of the plurality of connectors 27 and/or at least a portion of the plurality of supports 28. In this embodiment, a portion 42 of the outer perimeter wall 30 of the grilling assembly 10 extends a distance above the charcoal grates 32, 34. Charcoal is then placed on the first and second charcoal grates 32, 34 and it is lit to permit grilling to commence.

While a specific embodiment has been shown and described, many variations are possible. With time, additional features may be employed. The particular shape or configuration of the platform or the interior configuration may be changed to suit the system or equipment with which it is used.

Having described the invention in detail, those skilled in the art will appreciate that modifications may be made to the invention without departing from its spirit. Therefore, it is not intended that the scope of the invention be limited to the specific embodiment illustrated and described. Rather, it is intended that the scope of this invention be determined by the appended claims and their equivalents.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A grilling assembly for use with charcoal adapted for use with a non-charcoal grill, the grilling assembly comprising:
   a first tray and a second tray, the first tray and the second tray each including
      a flat base plate including a pair of sidewalls extending upwardly from the base plate, an outer wall extending upwardly and positioned between and connected to each sidewall, and an open end positioned opposite the outer wall, each pair of sidewalls and each outer wall including a plurality of openings therein, wherein the first tray and the second tray connect together, and at least one of the first tray and the second tray is configured to overlap the other to form an adjustable outer perimeter wall around the first tray and the second tray when connected;
   a plurality of connectors which connect the first tray to the second tray via at least a portion of the plurality of openings;
   a plurality of supports which connect to the connectors to fix the first tray and the second tray in a fixed position relative to each other; and
   a flat first charcoal grate and a flat second charcoal grate, each first and second charcoal grate including a plurality of openings formed therein, and each first and second charcoal grate configured to fit into the first tray and the second tray, respectively, and to extend to the outer perimeter wall of the first and second trays when connected, wherein at least one of the first and second charcoal grates is designed to overlap the other to conform to an adjusted position of the outer perimeter wall of the first and second trays when the first and second trays overlap, the first and the second charcoal grates configured to hold charcoal; and wherein at least a portion of the outer perimeter wall formed by the first and second trays when connected together extends above the first and the second charcoal grates.

2. The grilling assembly of claim 1, wherein the open end of the second tray slides into the open end of the first tray, and the flat base plate of the second tray overlaps at least a portion of the flat base plate of the first tray.

3. The grilling assembly of claim 2, wherein the second tray includes a slit on each sidewall to permit the connectors positioned through each sidewall of the first tray to slide into each respective slit on each sidewall of the second tray to adjust the positions of the first tray and the second tray relative to each other.

4. The grilling assembly of claim 1, wherein a plurality of perimeters form the plurality of openings in each first charcoal grate and second charcoal grate and the plurality of perimeters are ovoid in shape.

5. The grilling assembly of claim 4, wherein the plurality of openings formed in each first and second charcoal grate are positioned at an angle with respect to a grate perimeter of each first and second charcoal grate.

6. The grilling assembly of claim 1, wherein the plurality of connectors include screws and the plurality of supports include wing nuts.

7. The grilling assembly of claim 1, wherein the grilling assembly includes at least one leg to position the grilling assembly above a surface.

8. A method of using a grilling assembly for charcoal grilling in a non-charcoal grill, the method including:
providing a grilling assembly, comprising
a first tray and a second tray, the first tray and the second tray each including
a flat base plate including a pair of sidewalls extending upwardly from the base plate, an outer wall extending upwardly and positioned between and connected to each sidewall, and an open end positioned opposite the outer wall, each pair of sidewalls and each outer wall including a plurality of openings therein,
wherein the first tray and the second tray connect together, and at least one of the first tray and the second tray is configured to overlap the other to form an adjustable outer perimeter wall around the first tray and the second tray when connected;
a plurality of connectors which connect the first tray to the second tray via at least a portion of the plurality of openings;
a plurality of supports which connect to the connectors to fix the first tray and the second tray in a fixed position relative to each other; and
a flat first charcoal grate and a flat second charcoal grate, each first and second charcoal grate including a plurality of openings formed therein, and each first and second charcoal grate configured to fit into the first tray and the second tray, respectively, and extend to the outer perimeter wall of the first and second trays when connected, wherein at least one of the first and second charcoal grates is designed to overlap the other to conform to an adjusted position of the outer perimeter wall of the first and second trays, the first and the second charcoal grates configured to hold charcoal;
wherein at least a portion of the outer perimeter wall formed by the first and second tray when connected together extends above the first and the second charcoal grates;
connecting the first tray and the second tray of the grilling assembly via the positioning of at least a portion of the plurality of connectors through at least a portion of the plurality of openings;
inserting the first tray and the second tray into an opening of a non-charcoal grill and adjusting the outer perimeter wall of the first tray and the second tray relative to dimensions therein;
securing the first tray and the second tray in the fixed position via the plurality of supports;
positioning the first charcoal grate and the second charcoal grate within the first tray and the second tray, respectively by positioning at least a portion of the first charcoal grate and at least a portion of the second charcoal grate upon at least a portion of the plurality of supports, wherein at least one of the first charcoal grate and the second charcoal grate is configured to overlap the other when the first tray and the second tray overlap each other.

9. The method of claim 8, wherein in the step of connecting the first tray and the second tray, the open end of the second tray slides into the open end of the first tray, and the base plate of the second tray overlaps a portion of the base plate of the first tray.

10. The method of claim 9, wherein the second tray includes a slit on each sidewall to permit the connectors positioned through each sidewall of the first tray to slide into each respective slit on each sidewall of the second tray to adjust the positions of the first tray and the second tray relative to each other.

11. The method of claim 10, wherein the plurality of openings formed in each first and second charcoal grate are positioned at an angle with respect to a grate perimeter of each first and second charcoal grate.

12. The method of claim 8, wherein in the step of providing a grilling assembly, a plurality of perimeters form the plurality of openings in each first charcoal grate and second charcoal grate and the plurality of perimeters are ovoid in shape.

13. The method of claim 8, wherein in the step of providing a grilling assembly, the plurality of connectors include screws and the plurality of supports include wing nuts.

14. The method of claim 8, wherein in the step of providing a grilling assembly, the grilling assembly further includes at least one leg to position the grilling assembly above a surface, and wherein in the step of connecting the first tray and the second tray, the step further includes connecting the at least one leg to the first tray and the second tray.

* * * * *